United States Patent
Aoyama et al.

(10) Patent No.: US 11,962,215 B2
(45) Date of Patent: Apr. 16, 2024

(54) LINEAR MOTION MOTOR

(71) Applicants: Hitachi, Ltd., Tokyo (JP); The University of Tokyo, Tokyo (JP)

(72) Inventors: Yasuaki Aoyama, Tokyo (JP); Junnosuke Nakatsugawa, Tokyo (JP); Kunihiko Noriduki, Tokyo (JP); Takafumi Koseki, Tokyo (JP); Salman Ahmed, Tokyo (JP); Yuto Mitsui, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 322 days.

(21) Appl. No.: 17/615,985

(22) PCT Filed: May 18, 2020

(86) PCT No.: PCT/JP2020/019648
§ 371 (c)(1),
(2) Date: Dec. 2, 2021

(87) PCT Pub. No.: WO2020/261809
PCT Pub. Date: Dec. 30, 2020

(65) Prior Publication Data
US 2022/0329142 A1    Oct. 13, 2022

(30) Foreign Application Priority Data

Jun. 26, 2019  (JP) .................. 2019-118280

(51) Int. Cl.
*H02K 3/28* (2006.01)
*H02K 41/03* (2006.01)

(52) U.S. Cl.
CPC ............. *H02K 41/031* (2013.01); *H02K 3/28* (2013.01); *H02K 2213/03* (2013.01)

(58) Field of Classification Search
CPC ...... H02K 41/031; H02K 41/03; H02K 41/02; H02K 16/00; H02K 16/04; H02K 2213/03;
(Continued)

(56) References Cited

FOREIGN PATENT DOCUMENTS

| JP | 10-052025 A | 2/1998 |
|----|-------------|--------|
| JP | 11-262236 A | 9/1999 |

(Continued)

OTHER PUBLICATIONS

International Search Report of PCT/JP2020/019648 dated Jul. 28, 2020.

*Primary Examiner* — Bryan R Perez
(74) *Attorney, Agent, or Firm* — MATTINGLY & MALUR, PC

(57) ABSTRACT

A linear motor achieves both a decrease in pulsation and an increase in propulsion with a 6n teeth structure provided with: a first mover for holding permanent magnets arranged longitudinally; a first stator having 6n teeth that are arranged so as to oppose the first mover and 6n windings that are wound on the respective teeth; a second mover holding permanent magnets longitudinally; a second stator having 6n teeth that are arranged in the longitudinal direction so as to oppose the second mover and 6n windings that are wound on the respective teeth The permanent magnets opposing each other in the first mover and the second mover are disposed with a phase difference of $\pi/2$ in the moving direction of the two movers, and electrical currents with a phase difference of $(1+6m)\pi/3$ or $(2+6m)\pi/3$ are supplied to the windings opposing each other in the first stator and the second stator.

12 Claims, 9 Drawing Sheets

(58) Field of Classification Search
CPC ........ H02K 2213/12; H02K 3/28; H02K 3/04; H02K 1/24; H02K 1/16; H02K 1/148; H02K 1/17; H02K 1/246; H02K 1/34
See application file for complete search history.

(56) References Cited

FOREIGN PATENT DOCUMENTS

| | | | | |
|---|---|---|---|---|
| JP | 2015-008555 A | 1/2015 | | |
| JP | 2016-046999 A | 4/2016 | | |
| WO | WO-2013065236 A1 * | 5/2013 | ........... | H02K 11/215 |

* cited by examiner

LINEAR MOTION MOTOR

TECHNICAL FIELD

The invention relates to a linear motion motor (linear motor) in which a mover is driven linearly.

BACKGROUND ART

Lately, in various technical fields such as automobile, railroad, industrial equipment, and household appliances, a linear motion motor (linear motor) with a high controllability and efficiency has been adopted progressively as the power source of a linear motion operation. In accordance with an expanding use of the linear motion motor, there is an increasing demand for reduction in noise and vibration during the driving.

Differently from a rotary motor in which a magnetic circuit is formed in a circumferential shape, a linear motion motor, however, has end portions in the magnetic circuit, and the unbalance of the magnetic circuit causes pulsation of thrust, noise, and vibration.

From this background, for example, in FIG. 6 of Patent Literature 1, there is proposed a structure to reduce the pulsation by deviating the magnets of a plurality of movers and to suppress a reduction in the thrust by mutually deviating the phase sequence of the windings of a plurality of stators.

CITATION LIST

Patent Literature

Patent Literature 1: Japanese Patent Laid-Open No. 10-52025

SUMMARY OF INVENTION

Technical Problem

The Patent Literature 1 discloses a linear motion motor having only a structure of two poles and three teeth in which the three teeth of a stator face the two magnet poles of a mover, and does not clear a structure for increasing the thrust when a ratio of the number of magnets and the number of teeth is changed to further reduce the pulsation.

As a structure for reducing the pulsation of a linear motion motor driven by the three-phase current, for example, there is known a linear motion motor of a 6n teeth structure (n is a natural number) such as a six teeth structure (five poles and six teeth structure, seven poles and six teeth structure), a twelve teeth structure (eleven poles and twelve teeth structure, thirteen poles and twelve teeth structure) and the like; the Patent Literature 1, however, does not clear how to set the phases of the respective magnets of the mover and the phases of currents supplied to the respective windings of the stator in order to achieve both a reduction in the pulsation and an increase in the thrust.

Solution of Problem

In order to solve the above problems, a linear motion motor according to the embodiments on which a three-phase current is supplied, includes: a first mover that aligns and holds a plurality of permanent magnets in a longitudinal direction; a first stator having 6n (n is an arbitrary natural number) teeth aligned in the longitudinal direction to face the first mover and 6n windings wound around the respective teeth; a second mover that aligns and holds a plurality of permanent magnets in the longitudinal direction; a second stator having 6n (n is an arbitrary natural number) teeth aligned in the longitudinal direction to face the second mover and 6n windings wound around the respective teeth; and a bonding member for bonding the first mover and the second mover arranged in parallel, in which the opposite permanent magnets of the first mover and the second mover are arranged with a phase difference of $\pi/2$ in the advancing direction of the both movers, and the currents with the phase difference of $(1+6)\ \pi/3$ or $(2+6m)\ \pi/3$ (m is an arbitrary integer) are supplied to the opposite windings of the first stator and the second stator.

Advantageous Effects of Invention

According to the linear motion motor of the invention, it is possible to achieve both a reduction in pulsation and an increase in thrust in a linear motion motor of a 6n teeth structure.

DESCRIPTION OF EMBODIMENTS

With reference to FIGS. 1 to 10, embodiments of a linear motion motor according the invention will be described.

The linear motion motor according to the invention is a motor which is driven by a three-phase current and provided with a plurality of stators including the number 6n of teeth (n is arbitrary integer) and the same number of movers as the number of the stators. Hereinafter, the linear motion motor of a six teeth structure (first, second, and fifth embodiments) and the linear motion motor of a twelve teeth structure (third, fourth, sixth, and seventh embodiments), with two pairs of the movers and the stators will be described; however, as far as the effects of making good use of the magnetic flux of the permanent magnets can be obtained by arranging the teeth of the stators so as to sandwich the respective permanent magnets of the movers, the structure of the invention is not restricted to the structures as shown in FIGS. 1 to 10.

First Embodiment

With reference to FIGS. 1 to 4, a linear motion motor 1 according to a first embodiment of the invention will be described.

Figure 1:
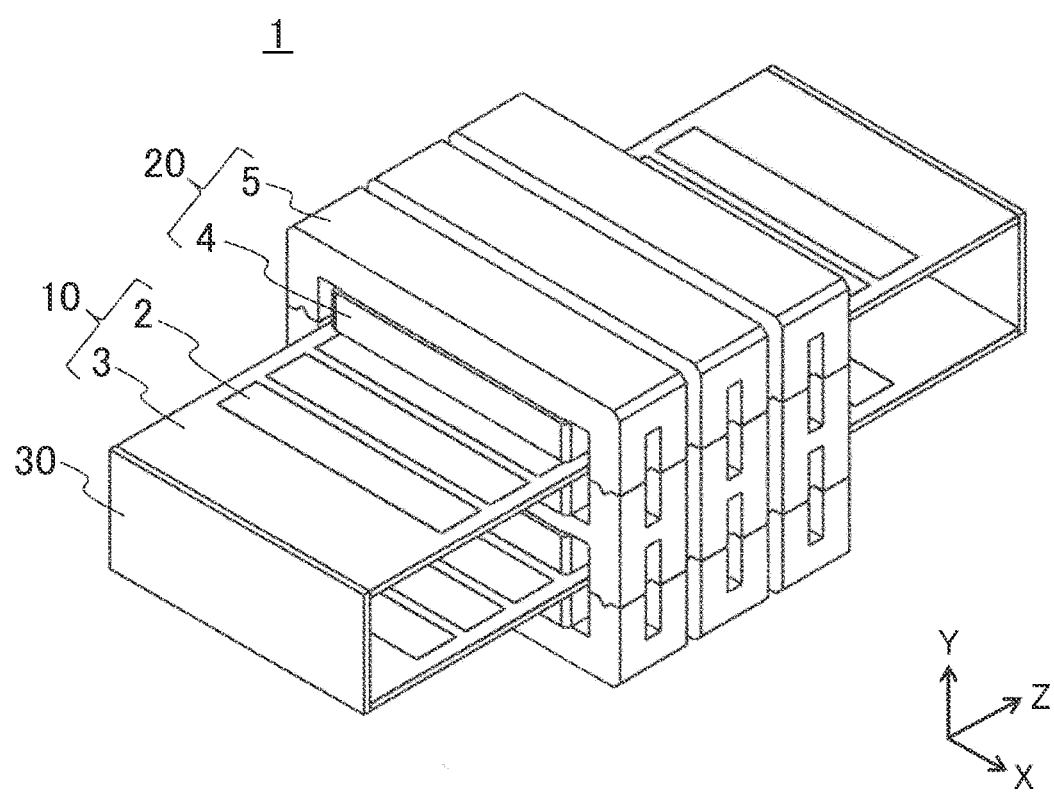
FIG. 1 is a perspective view of a linear motion motor according to a first embodiment.

As shown in the perspective view of FIG. 1, the linear motion motor 1 according to the embodiment is an electric motor mainly including a mover 10, a stator 20, and a bonding member 30 for bonding the mover 10. In FIG. 1, the width direction of the linear motion motor 1 is defined as an X direction, the height direction is defined as a Y direction, and the advancing direction of the mover 10 is defined as a Z direction.

The mover 10 includes a flat plate shaped permanent magnet 2 long in the X direction and a flat plate shaped holding member 3 long in the Z direction. The holding member 3 aligns and holds a plurality of permanent magnets 2 in the Z direction.

The stator 20 includes a winding 4 and a magnetic body 5. The magnetic body 5 is to form a magnetic circuit around the permanent magnet 2 of the mover 10, and provided with a plurality of teeth 6 facing the permanent magnet 2. The winding 4 is wound around each of the teeth 6 and a current is supplied there from a power source not illustrated. Here, the magnetic body 5 may be integrally molded by casting or the like, or may be formed by laminating electromagnetic steel sheets in the X direction or the Z direction.

In this linear motion motor 1, the mover 10 can be linearly driven in the Z direction by supplying a current of the phase described later to the winding 4 of the stator 20.

Figure 2:
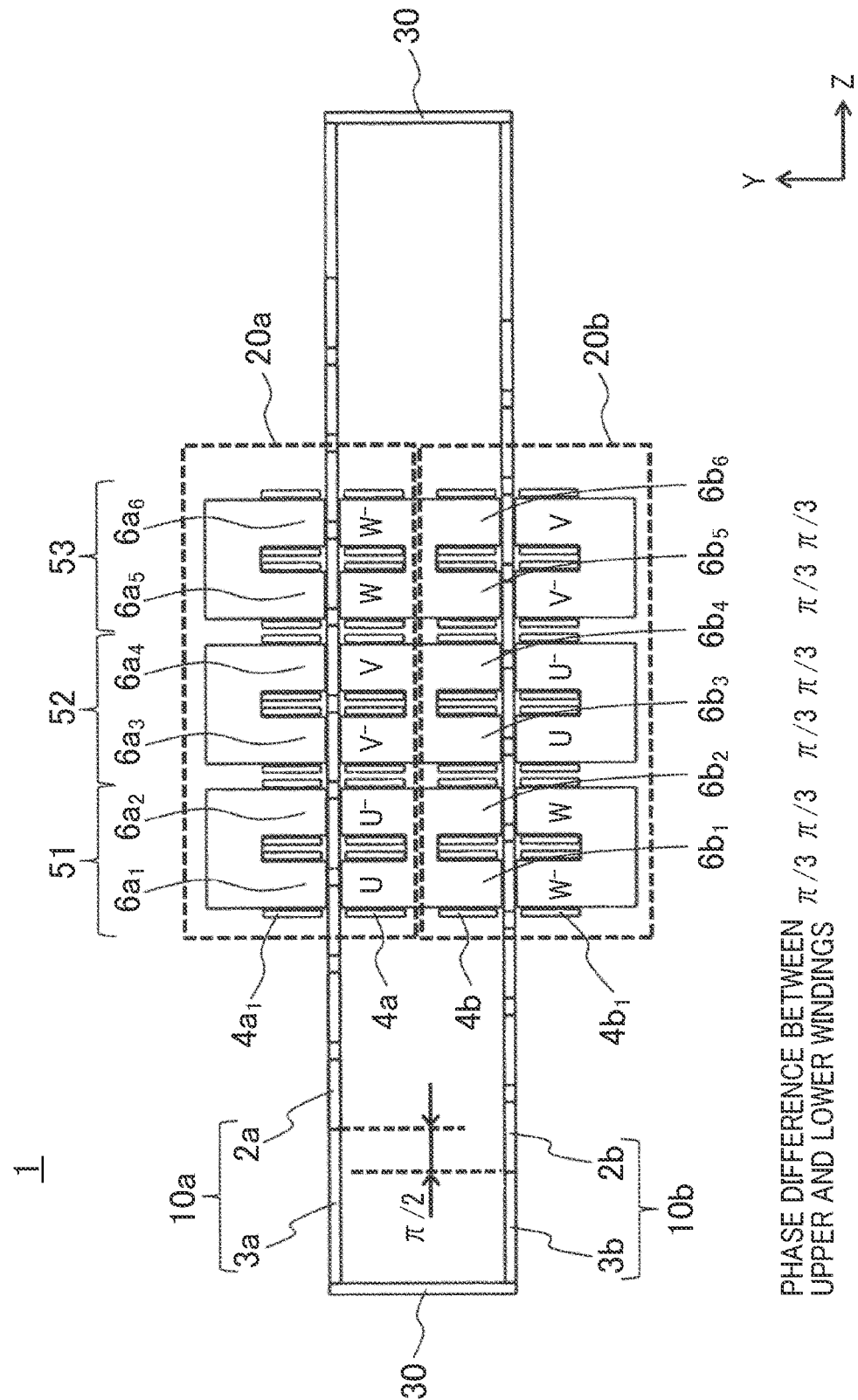
FIG. 2 is a cross-sectional view on a YZ plane of the linear motion motor according to the first embodiment.

FIG. 2 is a cross-sectional view on the YZ plane of the linear motion motor 1 of FIG. 1. As shown here, the linear motion motor 1 according to the embodiment, a pair of the mover 10 and the stator 20 (upper mover 10a and upper stator 20a) is arranged on the upper side, a pair of the mover 10 and the stator 20 (lower mover 10b and lower stator 20b) is arranged on the lower side, and by bonding the upper mover 10a and the lower mover 10b vertically arranged in parallel by the bonding member 30, a force working on the both movers can be combined when a current is supplied to the winding 4.

Further, the upper stator 20a includes six teeth 6a (teeth $6a_1$ to $6a_6$), and the winding 4a (windings $4a_1$ to $4a_6$) is wound around each of the teeth. Similarly, the lower stator 20b includes six teeth 6b (teeth $6b_1$ to $6b_6$), and the winding 4b (windings $4b_1$ to $4b_6$) is wound around each of the teeth.

As apparent from FIG. 2, the linear motion motor 1 according to the embodiment is formed in a five poles and six teeth structure in which the permanent magnets 2 of five poles face the six teeth 6 aligned in the Z direction. The opposite permanent magnets of the upper mover 10a and the lower mover 10b are arranged with a phase difference of π/2.

Figure 3:
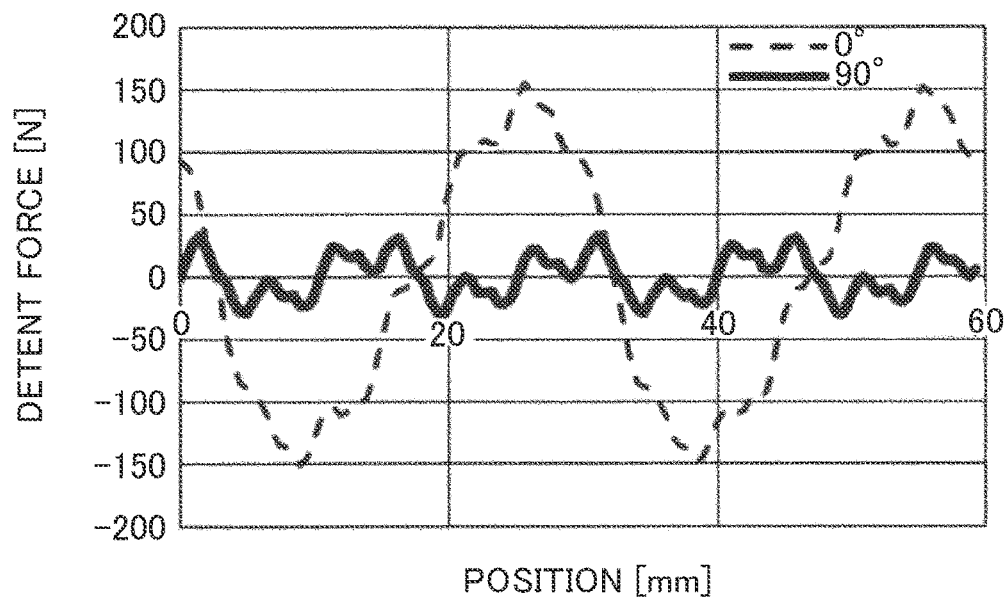
FIG. 3 is a detent waveform of the linear motion motor according to the first embodiment.

FIG. 3 shows a detent waveform of the linear motion motor 1 according to the embodiment. Here, the case in which there is no phase deviation in the arrangement of the permanent magnets 2 of the upper and lower movers 10 is shown as 0° (dotted line), and the case in which there is the phase deviation of π/2 is shown as 90° (solid line). As apparent from the above figure, the opposite permanent magnets 2 of the upper and lower movers 10 are arranged deviated from each other by π/2, which can reduce detent more than in the case of no deviation. Particularly, it can largely reduce the secondary pulsation caused by the influence of the end portions of the magnetic body 5 of the linear motion motor 1 and the unbalance of the magnetic body of three phases.

The magnetic body 5 divided into three in the Z direction contributes the reduction of the secondary pulsation. As shown in FIG. 2, the magnetic body 5 in the embodiment is divided into a magnetic body 51 including the teeth $6a_1$, $6a_2$, $6b_1$, $6b_2$, a magnetic body 52 including the teeth $6a_3$, $6a_4$, $6b_3$, $6b_4$, and a magnetic body 53 including the teeth $6a_5$, $6a_6$, $6b_5$, $6b_6$. By dividing the stator 20 in the Z direction as mentioned above, the influence of the magnetic body end portion can be equalized, hence to reduce the pulsation. By dividing the magnetic body 5 in the Z direction, size error and assembly error at the manufacturing the magnetic body 5 may increase the pulsation; however, by adjusting each phase of the upper and lower movers 10, each phase of the upper and lower windings, and the position of each magnetic body, it is possible to reduce also the pulsation other than the secondary one.

Further, as shown in FIG. 2, currents of the phases U, U-, V-, V, W, and W- are supplied to the respective windings (the windings $4a_1$ to $4a_6$) wound around the teeth $6a_1$ to $6a_6$ of the upper stator 20a. While, currents of the phases W-, W, U, U-, V-, and V are supplied to the respective windings (the winding $4b_1$ to $4b_6$) wound around the teeth $6b_1$ to $6b_6$ of the lower stator 20b. Here, each of the phase U and U-, the V and V-, and the W and W- has a phase difference of 180°, and each of the U and V, the V and W, and the W and U has a phase difference of 120°.

A phase difference between the opposite windings 4 of the upper stator 20a and the lower stator 20b is shown in the bottom of FIG. 2, when the currents of the above phases are supplied to the respective windings of the linear motion motor 1. In short, the phase difference in the currents supplied to the opposite windings 4 of the upper stator 20a and the lower stator 20b becomes all π/3.

Next, with reference to FIG. 4, current value and thrust characteristics when any phase difference between the opposite windings 4 is π/3 will be described. The dotted line (a) is a graph when the current phase is identical in the upper and lower windings 4, and the solid line (b) is a graph when the phase difference of π/3 is provided in the current phases of the upper and lower windings 4. From the comparison therebetween, when the identical current is supplied to the windings 4, it is found that the case of providing the phase difference of π/3 in the upper and the lower windings 4 can obtain a larger thrust than in the case of providing no phase difference. Here, although the phase difference between the upper and the lower windings is expressed as π/3, the phase difference of 2π may be provided; therefore, the phase difference provided between the upper and the lower windings can be generalized as (1+6m) π/3 (m is an arbitrary integer).

As mentioned above, according to the embodiment as described above, it is possible to achieve both a reduction in the pulsation and an increase in the thrust, according to the linear motion motor 1 of the five poles and six teeth structure.

The linear motion motor 1 according to the embodiment as described above can be adopted to, for example, a driving system, a linear motion power generation system, a linear motion actuator, and the like.

Second Embodiment

A linear motion motor 1 according to a second embodiment of the invention will be hereinafter described. Here, the overlapping description about the same points as the above mentioned embodiment is omitted.

Figure 5:
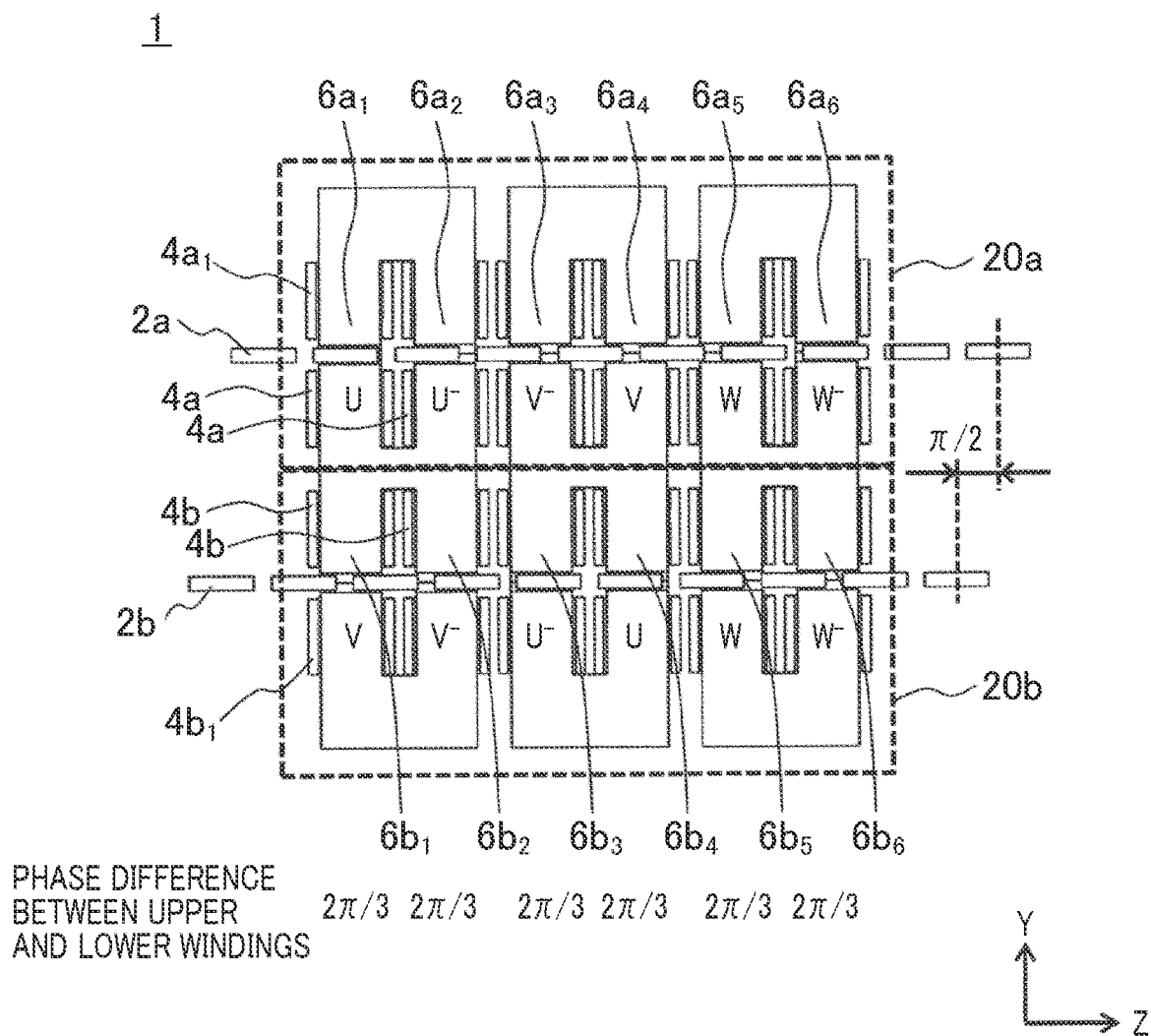
FIG. 5 is a cross-sectional view on the YZ plane of a linear motion motor according to a second embodiment.

As shown in FIG. 5, the linear motion motor 1 according to the embodiment has a structure of seven poles and six teeth in which the permanent magnets 2 of seven poles face the six teeth 6. For easy understanding of the arrangement of the permanent magnets 2 and the teeth 6, the holding member 3 is omitted in FIG. 5. Also in this embodiment, the secondary pulsation component of the mover is suppressed by defining the phase difference between the upper and the lower permanent magnets 2 as $\pi/2$.

Further, the currents of the phases U, U-, V-, V, W, and W- are respectively supplied to the windings 4a of the upper stator 20a, from the left to the right in FIG. 5. While, the currents of the phases V, V-, U-, U, W, and W- are respectively supplied to the windings 4b of the lower stator 20b, from the left to the right in the same figure. The phase difference between the windings of the upper stator 20a and the lower stator 20b is shown in the bottom of FIG. 5. In sort, any phase difference between the windings of the upper stator 20a and the windings of the lower stator 20b is all $2\pi/3$. Here, although the phase difference between the upper and the lower windings is expressed as $2\pi/3$, the phase difference of $2\pi$ may be provided and therefore, the phase difference provided between the upper and the lower windings can be generalized as $(2+6m)\pi/3$ (m is an arbitrary integer).

Figure 4:
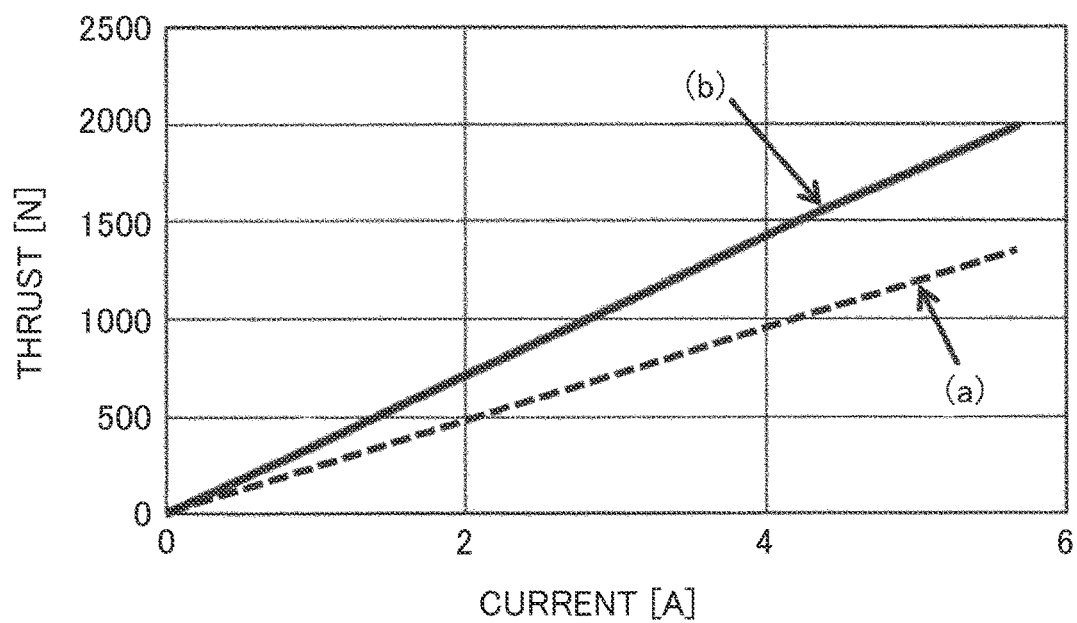
FIG. 4 shows thrust characteristics of the linear motion motor according to the first embodiment.

Also in the case of this structure, the same effects as described in the first embodiment according to FIGS. 3 and 4 can be obtained.

According to the embodiment as described above, it is possible to achieve both a reduction in the pulsation and an increase in the thrust in the linear motion motor 1 of the seven poles and six teeth structure.

Third Embodiment

Figure 6:
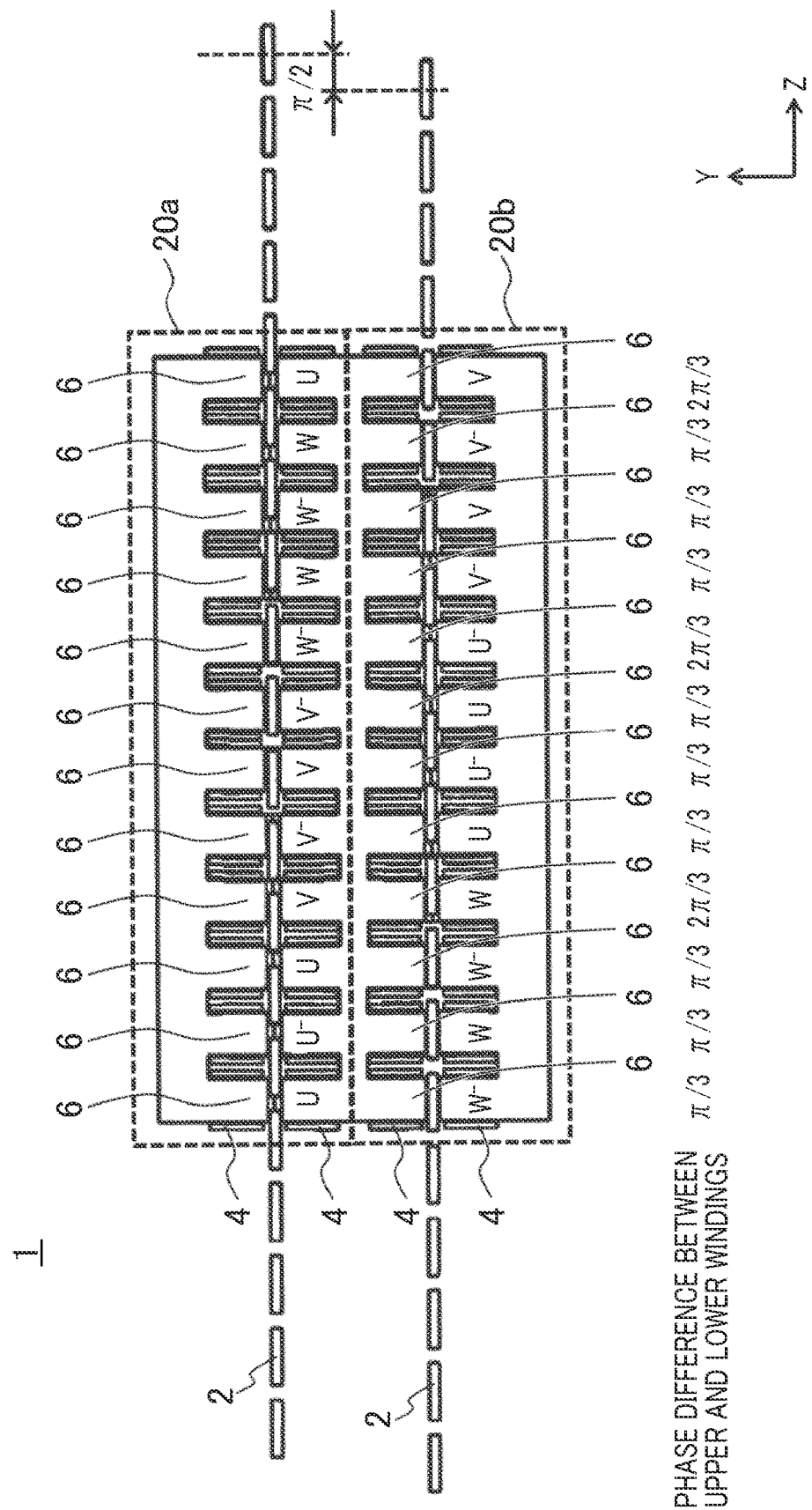
FIG. 6 is a cross-sectional view on the YZ plane of a linear motion motor according to a third embodiment.

A linear motion motor 1 according to a third embodiment of the invention will be hereinafter described. Here, the overlapping description about the same points as the above mentioned embodiment is omitted As shown in FIG. 6, this embodiment has an eleven poles and twelve teeth structure in which the permanent magnets 2 of eleven poles face the twelve teeth. Also in this embodiment, the secondary pulsation component of the mover is suppressed by defining the phase difference between the upper and lower permanent magnets 2 as $\pi/2$.

Further, the current phases of the windings 4a of the upper stator 20a are respectively defined as U, U-, U, V, V-, V, V-, W-, W, W-, W, and U, from the left to the right in FIG. 6, and the current phases of the windings 4b of the lower stator 20b are respectively defined as W-, W, W-, W, U, U-, U, U-, V-, V, V-, and V, from the left to the right in the same figure. According to this, in the same way as described in FIGS. 3 and 4 in the first embodiment, it is possible to form the linear motion motor capable of reducing the secondary pulsation and achieving a large thrust. Here, each phase difference between the windings of the upper stator 20a and the windings of the lower stator 20b becomes as $\pi/3$, $\pi/3$, $\pi/3$, $2\pi/3$, $\pi/3$, $\pi/3$, $\pi/3$, $2\pi/3$, $\pi/3$, $\pi/3$, $\pi/3$, and $2\pi/3$.

According to the embodiment as described above, it is possible to achieve both a reduction in the pulsation and an increase in the thrust in the linear motion motor 1 of the eleven poles and twelve teeth structure.

Fourth Embodiment

Figure 7:
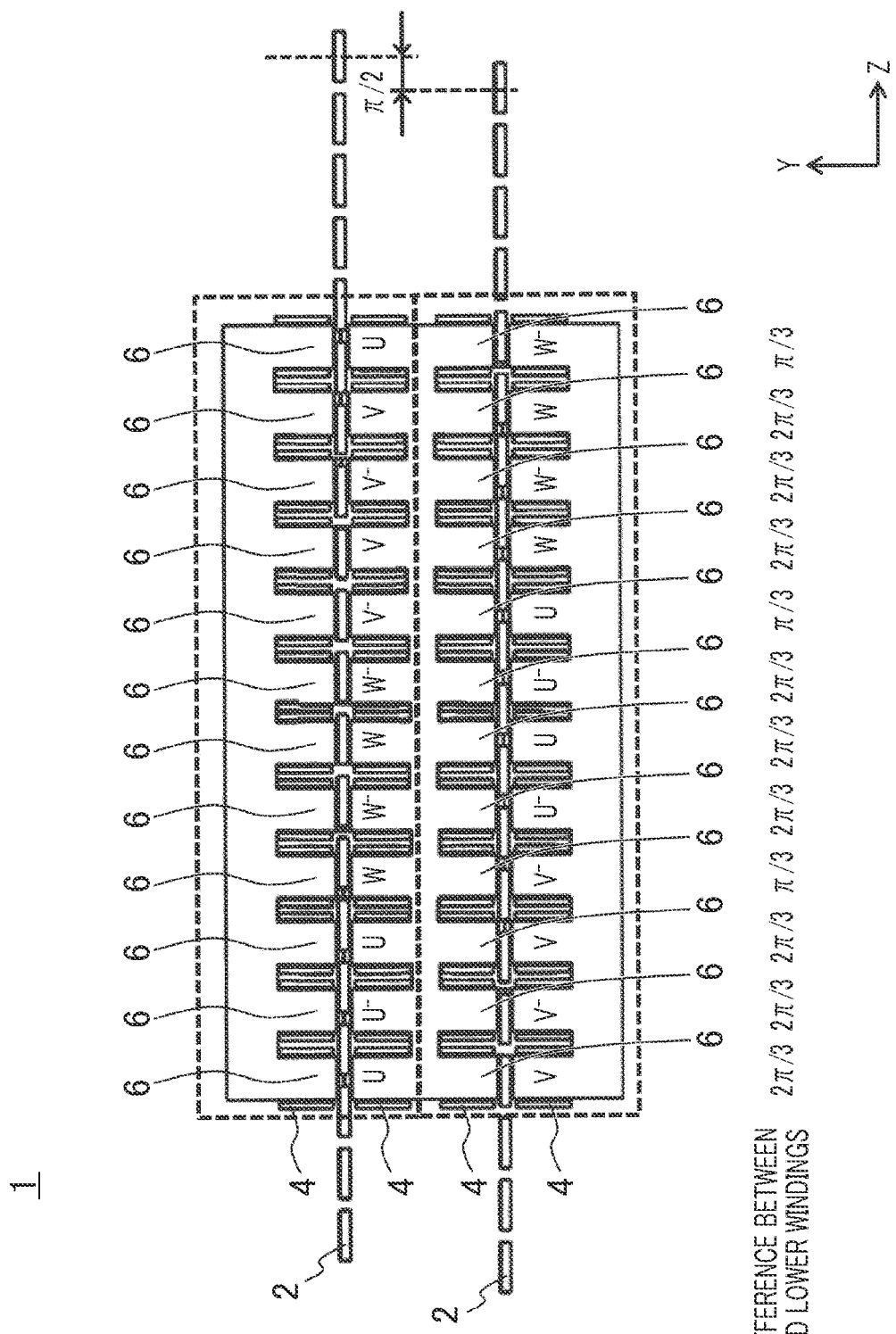
FIG. 7 is a cross-sectional view on the YZ plane according to a linear motion motor of a fourth embodiment.

A linear motion motor 1 according to a fourth embodiment of the invention will be hereinafter described. Here, the overlapping description about the same points as the above mentioned embodiment is omitted As shown in FIG. 7, the linear motion motor 1 of this embodiment has a thirteen poles and twelve teeth structure in which the permanent magnets 2 of thirteen poles face the twelve teeth. Also in this embodiment, the secondary pulsation component of the mover is suppressed by defining the phase difference between the upper and lower permanent magnets 2 as $\pi/2$.

Further, the current phases of the windings 4a of the upper stator 20a are respectively defined as U, U-, U, V, V-, V, V, W-, W, W-, W, and U, from the left to the right in FIG. 7, and the current phases of the windings 4b of the lower stator 20b are respectively defined as V, V-, V, V-, U-, U, U-, U, W, W-, W, and W-, from the left to the right in the same figure. According to this, in the same way as described in FIGS. 3 and 4 in the first embodiment, it is possible to form the linear motion motor capable of reducing the secondary pulsation and achieving a large thrust. Here, each phase difference between the windings of the upper stator 20a and the windings of the lower stator 20b becomes as $2\pi/3$, $2\pi/3$, $2\pi/3$, $\pi/3$, $2\pi/3$, $2\pi/3$, $2\pi/3$, $\pi/3$, $2\pi/3$, $2\pi/3$, $2\pi/3$, and $\pi/3$.

According to the embodiment as described above, it is possible to achieve both a reduction in the pulsation and an increase in the thrust in the linear motion motor 1 of the thirteen poles and twelve teeth structure.

Fifth Embodiment

A linear motion motor 1 according to a fifth embodiment of the invention will be hereinafter described. Here, the overlapping description about the same points as the above mentioned embodiment is omitted.

Figure 8:
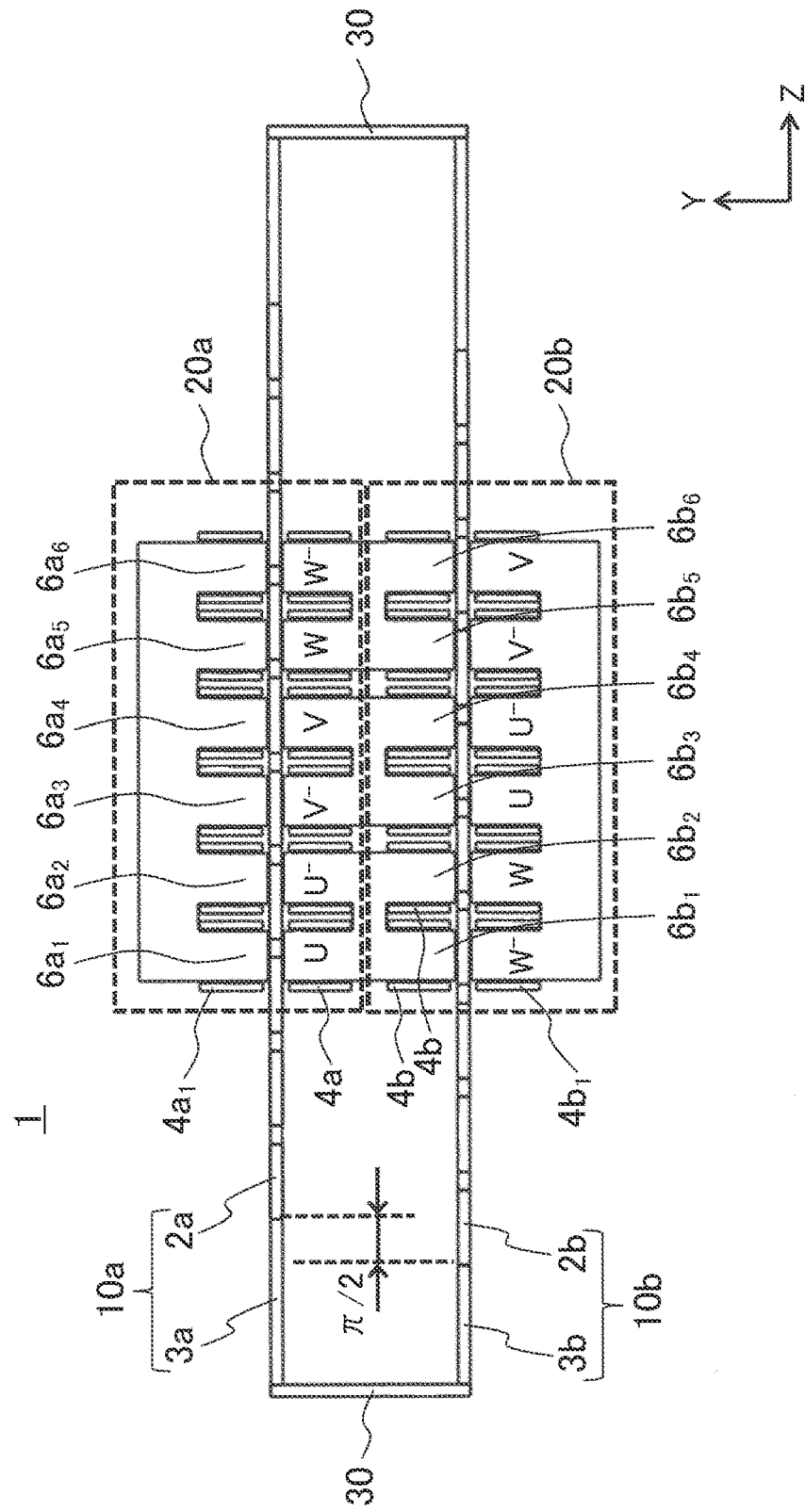
FIG. 8 is a cross-sectional view on the YZ plane according to a linear motion motor of a fifth embodiment.

As shown in FIG. 8, the linear motion motor 1 of this embodiment has a five poles and six teeth structure in which the permanent magnets 2 of five poles face the six teeth. Although the magnetic body 5 is formed divided in the Z direction in the first embodiment and the like, the respective teeth of the upper stator 20a and the lower stator 20b are bonded and integrated in the Z direction. By bonding the respective teeth of the upper stator 20a and the lower stator 20b in the Z direction, it is possible to combine the pulsations generated by supplying the currents of the respective phases and effectively cancel the pulsation.

According to the embodiment as described above, it is possible to achieve both a reduction in the pulsation and an increase in the thrust in the linear motion motor 1 of the five poles and six teeth structure.

Six Embodiment

Figure 9:
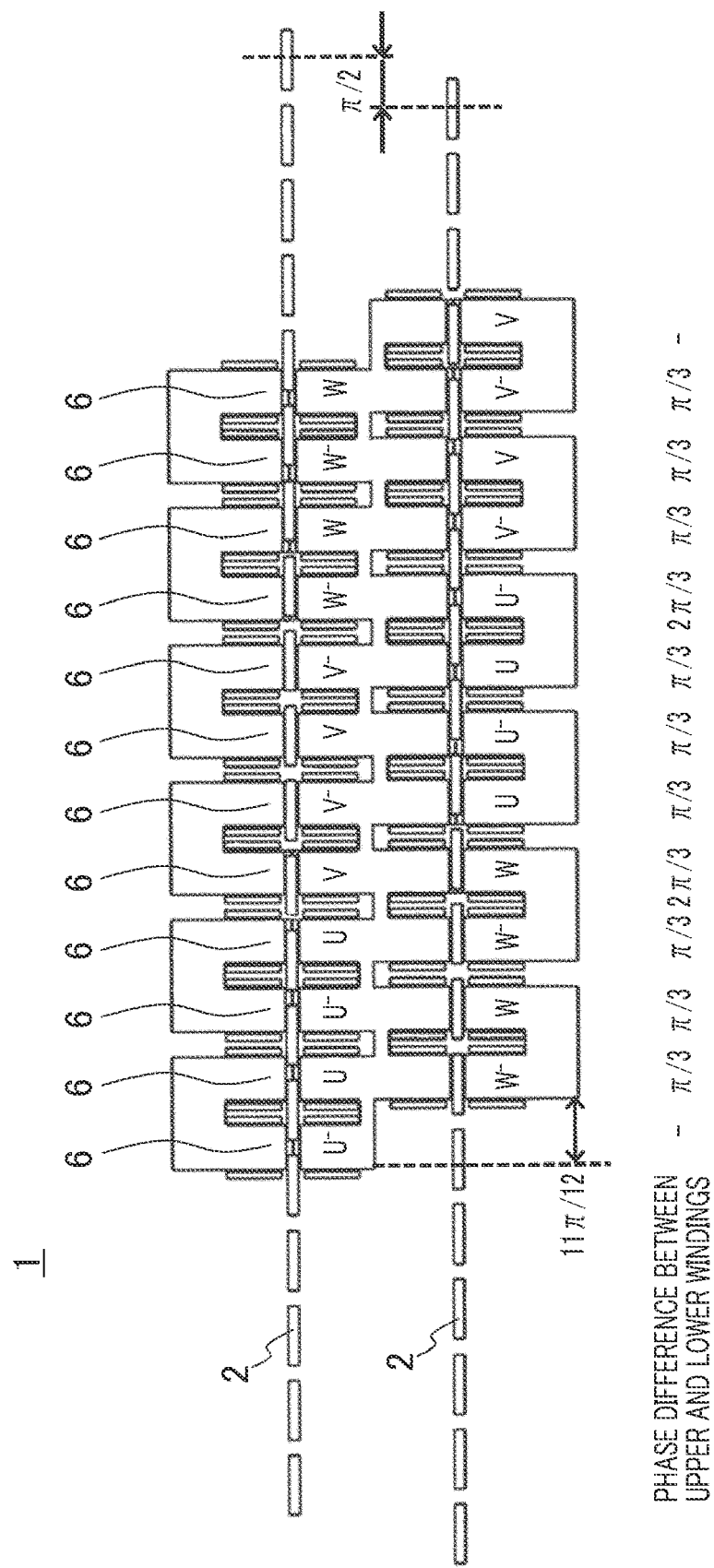
FIG. 9 is a cross-sectional view on the YZ plane according to a linear motion motor of a sixth embodiment.

A linear motion motor 1 according to a sixth embodiment of the invention will be hereinafter described. Here, the overlapping description about the same points as the above mentioned embodiment is omitted As shown in FIG. 9, the linear motion motor 1 of this embodiment has an eleven poles and twelve teeth structure in which the permanent magnets 2 of eleven poles face the twelve teeth. Here, the windings 4 corresponding to the upper stator 20a is deviated from the windings 4 corresponding to the lower stator 20b with a phase of $11\pi/12$.

In the eleven poles and twelve teeth structure of the third embodiment as shown in FIG. 6, since the phase of the winding 4 of the upper stator 20a is U-phase on the left and right ends, it is necessary to connect the both ends of the stator 20a, which may increase a resistance and produce a problem of wiring space.

On the contrary, as shown in this embodiment, by deviating the upper windings 4 from the lower windings by the phase of $11\pi/12$, the windings 4 of the same phase (for example, U, U-) can be gathered together, which makes the wiring of the windings 4 easy.

Further, the current phases of the windings 4a of the upper stator 20a are respectively defined as U-, U, U-, U, V, V-, V, V-, W-, W, W-, and W, from the left to the right in FIG. 9, and the current phases of the windings 4b of the lower stator 20b are respectively defined as W-, W, W-, W, U, U-, U, U-, V-, V, V-, and V, from the left to the right of the same figure. In short, the upper stator 20a is deviated from the lower stator 20b by 11π/12, and each phase difference between the upper and the lower windings 4 can be as—(no winding on one part), π/3, π/3, π/3, 2π/3, π/3, π/3, π/3, 2π/3, π/3, π/3, π/3, and—(no winding on one part). According to this, in the same was as described in the first embodiment of FIGS. 3 and 4, it is possible to form the linear motion motor capable of reducing the pulsation, achieving a large thrust, and forming the windings easily.

According to the embodiment as described above, it is possible to achieve both a reduction in the pulsation and an increase in the thrust in the linear motion motor 1 of the eleven poles and twelve teeth structure.

Seventh Embodiment

A linear motion motor 1 according to a seventh embodiment of the invention will be hereinafter described. Here, the overlapping description about the same points as the above mentioned embodiment is omitted.

Figure 10:
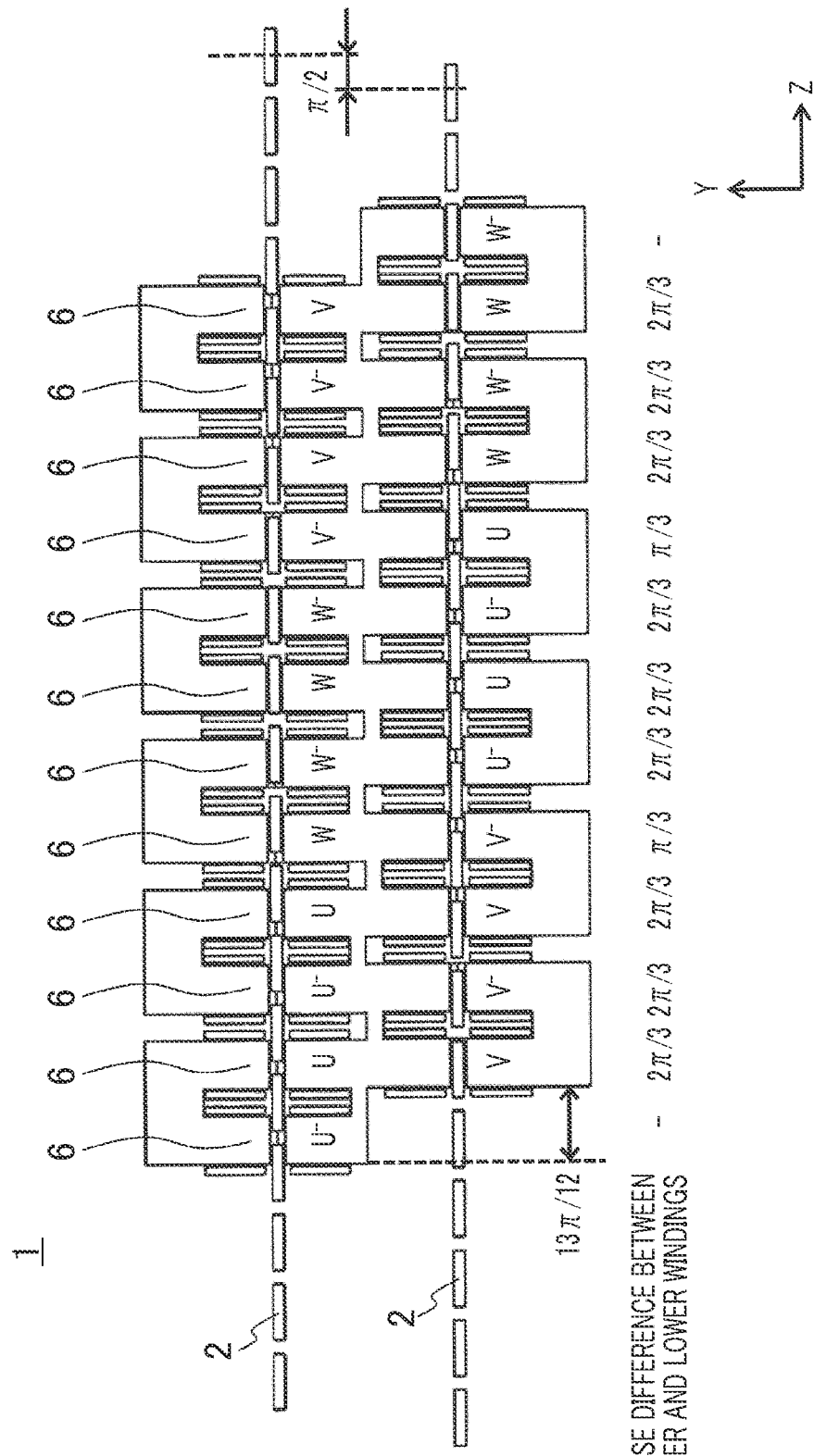
FIG. 10 is a cross-sectional view on the YZ plane according to a linear motion motor of a seventh embodiment.

As shown in FIG. 10, the linear motion motor 1 of this embodiment has a thirteen poles and twelve teeth structure in which the permanent magnets 2 of thirteen poles face the twelve teeth. Here, the windings 4 corresponding to the upper stator 20a are deviated from the windings corresponding to the lower stator 20b by the phase of 13π/12.

Since in the thirteen poles and twelve teeth structure of the fourth embodiment shown in FIG. 7, the phase of the winding 4 of the upper stator 20a is U-phase on the left and the right ends, it is necessary to connect the both ends of the stator 20a, which may increase a resistance and produce a problem of the wiring space.

On the contrary, as shown in this embodiment, by deviating the upper windings 4 from the lower windings by the phase of 13π/12, the windings 4 of the same phase (for example, U, U-) can be gathered together, which makes the wiring of the windings 4 easy.

Further, the current phases of the windings 4a of the upper stator 20a are respectively defined as U-, U, U-, U, W, W-, W, W-, V-, V, V-, and V, from the left to the right in FIG. 10, and the current phases of the windings 4b of the lower stator 20b are respectively defined as V, V-, V, V-, U-, U, U-, U, W, W-, W, and W-, from the left to the right in the same figure. In short, the upper stator 20a is deviated from the lower stator 20b by 13π/12, and the phase differences between the upper and the lower windings 4 may be defined as—(no winding on one part), 2π/3, 2π/3, 2π/3, π/3, 2π/3, 2π/3, 2π/3, π/3, 2π/3, 2π/3, 2π/3, and—(no winding on one part). According to this, in the same way as described in the first embodiment in FIGS. 3 and 4, it is possible to form the linear motion motor capable of reducing the pulsation, achieving a large thrust, and forming the windings easily.

According to the embodiment as described above, it is possible to achieve both a reduction in the pulsation and an increase in the thrust in the linear motion motor 1 of the thirteen poles and twelve teeth structure.

LIST OF REFERENCE SIGNS

1: linear motion motor, 2: permanent magnet, 2a: permanent magnet, 2b: permanent magnet, 3: holding member, 3a: holding member, 3b: holding member, 4: winding, 4a: winding, 4b: winding, 5: magnetic body, 51: magnetic body, 52: magnetic body, 53: magnetic body, 6: teeth, 6a: teeth, 6b: teeth, 10: mover, 10a: upper mover, 10b: lower mover, 20: stator, 20a: upper stator, 20b: lower stator, 30: bonding member

The invention claimed is:

1. A linear motion motor on which a three-phase current is supplied, comprising:
   a first mover that aligns and holds a plurality of permanent magnets in a longitudinal direction;
   a first stator including 6n (n is an arbitrary natural number) teeth aligned in the longitudinal direction to face the first mover and 6n windings wound around the respective teeth;
   a second mover that aligns and holds a plurality of permanent magnets in the longitudinal direction;
   a second stator including 6n (n is an arbitrary natural number) teeth aligned in the longitudinal direction to face the second mover and 6n windings wound around the respective teeth; and
   a bonding member for bonding the first mover and the second mover arranged in parallel, in which
   the opposite permanent magnets of the first mover and the second mover are arranged with a phase difference of π/2 in an advancing direction of the both movers, and
   currents with the phase difference of (1+6m) π/3 or (2+6m) π/3 (m is an arbitrary integer) are supplied to the opposite windings of the first stator and the second stator.

2. The device according to claim 1, in which
   the respective stators are divided into several portions in the longitudinal direction.

3. The device according to claim 1,
   having a structure in which the permanent magnets of five poles face the six teeth, in which
   currents with the phase difference of π/3 are supplied to the opposite windings of the first stator and the second stator.

4. The device according to claim 1,
   having a structure in which the permanent magnets of seven poles face the six teeth, in which
   currents with the phase difference of 2π/3 are supplied to the opposite windings of the first stator and the second stator.

5. The device according to claim 1,
   having a structure in which the permanent magnets of eleven poles face the twelve teeth, in which
   currents with the phase differences of π/3, π/3, π/3, 2n/3, π/3, π/3, π/3, 2π/3, π/3, π/3, π/3, and 2π/3 are supplied to the opposite windings of the first stator and the second stator from one end to the other.

6. The device according to claim 1,
   having a structure in which the permanent magnets of thirteen poles face the twelve teeth, in which
   currents with the phase differences of 2π/3, 2π/3, 2π/3, π/3, 2π/3, 2π/3, 2π/3, π/3, 2π/3, 2π/3, 2π/3, and π/3 are supplied to the opposite windings of the first stator and the second stator from one end to the other.

7. The device according to claim 1,
   having a structure in which the permanent magnets of p poles (p is a natural number) face q teeth (q is a natural number), in which
   the phase difference becomes pπ/q in the arrangement of the opposite windings of the first stator and the second stator.

8. The device according to claim 1,
having a structure in which the permanent magnets of eleven poles face the twelve teeth, in which
the phase difference is $11\pi/12$ in the arrangement of the opposite windings of the first stator and the second stator.

9. The device according to claim 1,
having a structure in which the permanent magnets of thirteen poles face the twelve teeth, in which
the phase difference is $13\pi/12$ in the arrangement of the opposite windings of the first stator and the second stator.

10. A driving system having the linear motion motor according to claim 1.

11. A linear motion power generation system having the linear motion motor according to claim 1.

12. A linear motion actuator having the linear motion motor according to claim 1.

\* \* \* \* \*